June 11, 1935. J. A. FLANZER ET AL Re. 19,605

VARIABLE RESISTOR

Original Filed Oct. 2, 1930 2 Sheets-Sheet 1

JOSEPH A. FLANZER
LESTER L. JONES AND
EMIL REISMAN,
INVENTORS

ATTORNEYS

VARIABLE RESISTOR

Original Filed Oct. 2, 1930 2 Sheets-Sheet 2

JOSEPH A. FLANZER,
LESTER L. JONES AND
EMIL REISMAN
INVENTORS.

ATTORNEY

Reissued June 11, 1935 Re. 19,605

UNITED STATES PATENT OFFICE 19,605

VARIABLE RESISTOR

Joseph A. Flanzer, Brooklyn, N. Y., Lester L. Jones, Oradell, N. J., and Emil Reisman, Upper Darby, Pa., assignors to Technidyne Corporation, New York, N. Y., a corporation of New York Original No. 1,959,097, dated May 15, 1934, Serial No. 485,854, October 2, 1930. Application for reissue November 30, 1934, Serial No. 755,442

20 Claims. (Cl. 201—55)

This invention relates to variable resistors, particularly those employing a resistance film coated on an insulation base, and more especially to such resistors provided in compact form and having small over-all dimension.

In copending applications of Lester L. Jones, Serial No. 193,357, filed May 21, 1927, and Serial No. 350,731, filed March 28, 1929, (since issued as Patents 1,836,600 and 1,819,246 on December 15, 1931 and August 18, 1931, respectively) there are disclosed variable resistors in which the resistance element consists of a thin resistance film coated on an insulation base. The object of the present invention is to generally improve the construction and operation of such resistors, and particularly with a view to providing a compact resistor which is exceedingly small in over-all dimension.

The resistance element consists of an enameled base, on one face of which an annular film of resistance material is painted. In order to reduce the over-all diameter of the finished resistor, we make the insulation base in the form of a circular disc which is only slightly larger than the desired outside diameter of the resistance film, or, differently expressed, the resistance film is painted closely to the edge of the enameled disc.

It is necessary to provide a terminal contact at one end of the resistance film. In order to make the unit operative as a potentiometer, it is desirable to provide terminal contacts at both ends of the resistance film. As is set forth in the latter of the above-identified applications, these terminal contacts may best be provided by painting the end of the resistance film with a silver paint. In order to obtain an outside connection with these terminals they have heretofore been extended beyond the diameter of the resistance film. In accordance with one of the objects of the present invention, the diameter of the complete resistor is not much greater than that of the resistance film, and to fulfill this object and yet provide convenient contact with the terminal contacts, we find it possible and convenient to paint the terminals over the resistance film and to extend the painted terminals around the edge of the base and onto the back thereof, at which point contact may readily be made with connector lugs projecting from the back of the finished resistor.

As is above indicated, compactness in the present resistor is attained, first, by painting the resistance film close to the edge of the insulation base, and, second, by painting the silver contact terminals around the edge of the base. These two expedients introduce considerable difficulty because of the fact that the insulation base is enameled. The enamel tends to form round surfaces because of its cohesiveness and surface tension. When a sheet of material having square cut edges is enameled, the enamel tends to bulge at the periphery of the disc. This makes the resulting base unsatisfactory for receiving a resistance film close to the edge thereof, inasmuch as the sliding contact will not have a flat surface on which to ride. If the sheet material is made of metal, as is usually the case, additional difficulty arises because the enamel in tending to round itself, cuts close to and frequently exposes the sharp corner edges of the metal. This makes the base unsatisfactory for the application of the silver paint which is extended around the edge and onto the back of the same.

Accordingly, a further object of our invention is to overcome the foregoing difficulties and to make it possible to obtain a more satisfactory and continuous coating of enamel on a base, with the application of fewer or even one coat of enamel. This, we have found, is possible by rounding the edge of the sheet metal before applying enamel to the same. When the base is rounded in this manner the enamel follows the natural curve of the edge, and no bulge is formed. A perfectly plane surface results, on which the resistance film may be painted as closely to the edge thereof as may be desired.

Contact with the resistance film is made by a sliding brush or floating contact which slides directly upon the surface of the resistance film. As has been set forth in the above-identified copending applications, this contact is preferably made of pure silver in order to take advantage of a certain amount of natural lubrication between the resistance film and the silver, and in order to prevent abrasion and wearing out of either the resistance film or the silver. The sliding brush is preferably formed with a number of individually movable fingers in order to make good contact over the entire width of the film, and the effective operation of the brush therefore depends upon it having a certain amount of natural resiliency. A further object of our invention is to provide a brush contact which will be economical in the use of silver, which will possess the advantageous wearing properties of a soft metal such as pure silver, and which, at the same time, will possess the advantageous springiness of relatively hard resilient metals such as phosphor bronze or nickel silver. To this end, we provide a brush, the outer surface of which is made of a thin lamination of pure silver which is backed up or supported by and made resilient by a backing spring made of phosphor bronze or nickel silver and the like. This construction may be attained most conveniently and satisfactorily by superimposing a very thin sheet of pure silver with a thin sheet of the backing metal, and thereafter handling the compound sheet of material as a single sheet of material when running the same through the dies which cut and form the sheet material into the desired shape of the brush.

The brush is pivotally mounted on a rotatable contact arm which is fixed to a rotatable control shaft. This contact arm should be as resilient as possible, and this effect may ordinarily be obtained by reason of the radial length thereof between the axis of rotation and the brush. In the present resistor, however, in which the entire diameter of the unit may be exceedingly small, it is desirable that the resilient length of the contact arm be made considerably greater than the effective radius thereof. To fulfil this object we have devised a contact arm which may be stamped out of a single piece of resilient sheet metal, and which comprises a central portion which is fixed to the shaft and an outer portion fixed to the central portion at one side thereof, the slidable brush being mounted on the outer portion at the opposite side thereof. This construction makes the resilient length of the contact arm equal to the diameter, rather than the radius thereof.

Other objects of the present invention are concerned with the provision of a compact assembly for the finished resistor, and the construction of the elements of the resistor so that they may be conveniently assembled to form the completed resistor.

To the accomplishment of the foregoing and such other objects as will hereinafter appear, our invention consists in the resistor elements and their relation one to the other as hereinafter are more particularly described in the specification and sought to be defined in the claims. The specification is accompanied by drawings in which:

Figure 1:
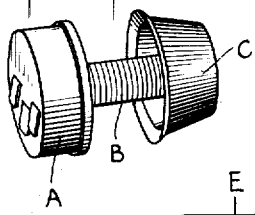
Fig. 1 is a perspective view of a finished resistor.

A perspective view of a finished resistor made in accordance with our invention is shown in Fig. 1. As is evident from that figure, the resistor comprises a cylindrical body A which may be mounted directly upon a panel or the like by means of a threaded bushing B. It should be noted that the body A of the resistor is quite small in length, while the diameter thereof is no greater than that of the adjusting knob C which itself is relatively small. More specifically, the resistor may successfully be constructed with the body A having a diameter of only about three-quarters of an inch, and a preferred and popular size is one in which the diameter of the body A is about one inch. These resistors are, of course, intended for special use in which size is an important factor, and particularly so where the conflicting requirements of small size and very high resistance variation must be met. A specific example of such use is the mounting of a volume control resistor directly upon the tone arm of a magnetic pickup for phonographs.

Figure 2:
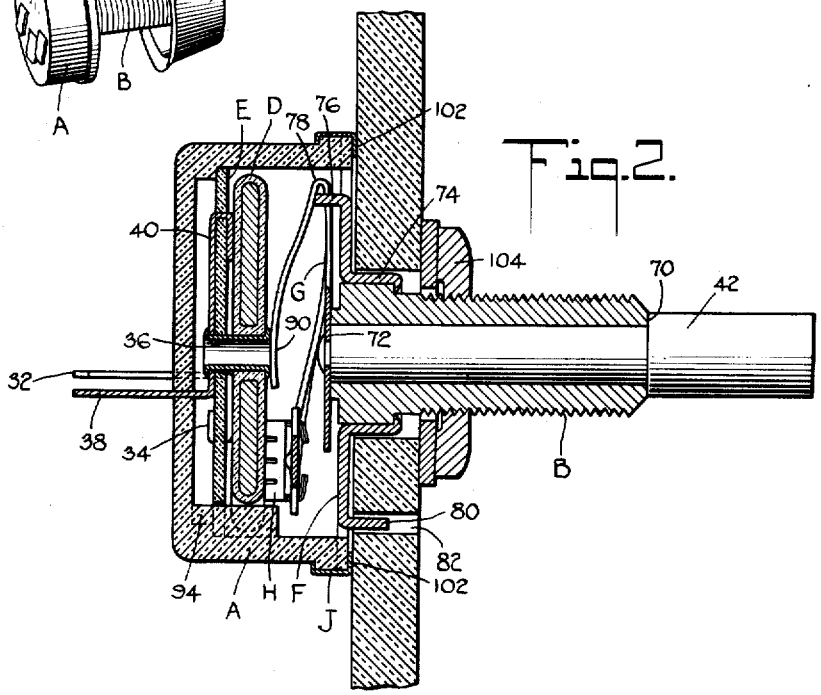
Fig. 2 is a section taken through the same.
Figure 3:
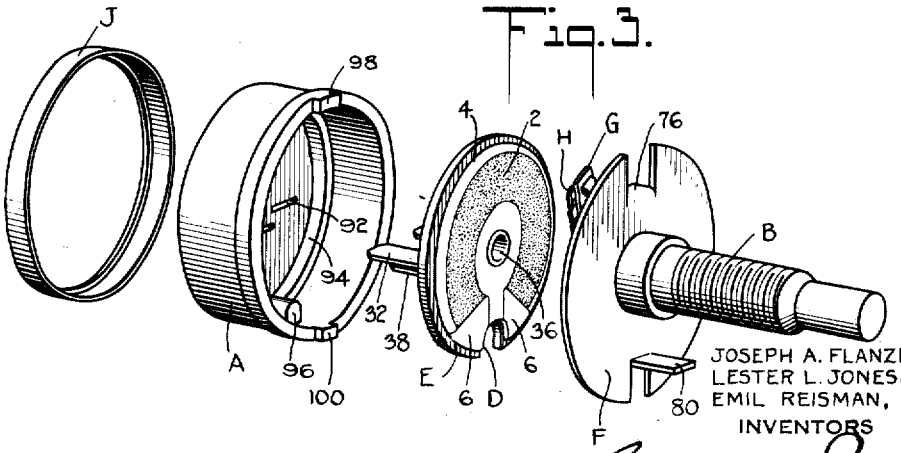
Fig. 3 is an exploded view showing the method of assembling the resistor.

Referring to Figs. 2 and 3, the resistor may be described, generally, as comprising a cup-shaped housing or casing A in which there is housed a resistance element assembly comprising a resistance element D and a contact lug disc E, and on which there is mounted a contact arm assembly comprising a bearing plate F and a contact arm G carrying a brush H. The bearing plate F is permanently attached to the casing A by means of a sealing ring J. As is evident from an inspection of Fig. 3, these elements may be assembled together in an exceedingly simple manner by merely dropping the resistance element assembly D, E into the bottom of the housing A, thereafter applying the bearing plate F to the edge of the housing, and locking the plate and housing together by means of the sealing ring J.

These elements will next be considered in greater detail. The resistance element D employs enamel for insulation. This enamel is ordinarily applied to a sheet metal stamping, which is desirable because of the ease with which the sheet metal may be stamped to desired configuration, and because of the efficient heat dissipating properties of the metal. However, in special cases in which it is essential that there be no appreciable capacitance in the resistor, as when dealing with very high radio frequencies, the plate may be made of an insulation such as isolantite. Even in such cases it is preferable that the plate be subsequently enameled, because the surface of the isolantite is not nearly as smooth as that of the enamel, and the surface irregularities may project through the thin resistance film and wear the sliding contact excessively.

Figure 5:
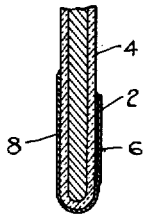
Fig. 5 is a detail section through the resistance element.

In order to obtain the desired compactness in dimension, the resistance film is applied as near to the edge of the enameled plate as possible. This is evident from Fig. 3, in which it will be observed that the annular resistance film 2 extends quite close to the edge 4 of the resistance element D. Terminal contacts for the resistance film 2 are provided by painting the ends of the resistance film with silver paint in order to form the terminals 6. Only one such terminal is needed when the unit is to be used as a resistor, but it is convenient to provide both terminals so that the unit may be employed, when desired, as a potentiometer. In accordance with another feature of the present invention, in order to conserve space, contact is made with the terminals 6 at the back of the resistance element, and for this purpose the terminals are extended around the edge and onto the back of the enameled base. This is clearly evident in Fig. 5 in which it will be seen that the resistance film 2, painted on the enameled base 4, is superimposed by a coating of silver 6 which is extended around the edge of the enameled base and onto the opposite side in order to form the terminal face 8.

The nature of the enamel and method of applying and treating the same; the nature of the resistance paint and the method of applying and treating the same and of adjusting the resistance thereof to desired uniform or tapered values; and the nature of the silver paint and the method of applying and treating the same, are not being described in the present application, and reference may be made to U. S. Patent No. 1,773,105 issued to Lester L. Jones, Alois Schmidt, and Joseph Jones on August 19, 1930, and to the copending applications of Emil Reisman, Serial No. 350,478, filed March 28, 1929, since issued as Patent 1,808,790, dated June 9, 1931, Joseph A. Flanzer and Emil Reisman, Serial No. 393,573, filed September 18, 1929, since issued as Patent 1,881,445, dated October 11, 1932, Emil Reisman, Serial No. 393,574, filed September 18, 1929, Joseph A. Flanzer, Serial No. 444,614, filed April 15, 1930, since issued as Patent 1,906,848, dated May 2, 1933, and Joseph A. Flanzer and Lester L. Jones, Serial No. 467,832, filed July 14, 1930, since issued as Patent 1,962,438, dated June 12, 1934, as well as the previously identified copending applications, for detailed information on these points.

Figure 9:
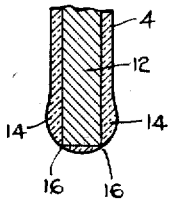
Figs. 9 and 10 are detail sections illustrative of a feature of our invention.
Figure 10:
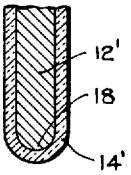
Figure 10:
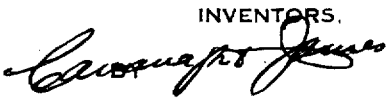

It has heretofore been the practice to employ a sheet having square cut edges, such as the sheet 12 in Fig. 9. When enamel is applied to such a sheet, because of the cohesion and surface tension of the enamel there is a tendency for the surface of the enamel to round itself wherever possible rather than to take sharp corners, and consequently there is a distinct bulge of enamel at the edge of the sheet 12. This bulge forms ridges 14 on the face of the disc and at the same time cuts the corners of the disc closely, and even permits exposure of the same, as at the points 16. Regardless of what material the sheet 12 is made from, the bulges 14 introduce a difficulty in that they prevent the resistance film from being applied near the edge of the enameled base, for the film should, of course, be applied to a plane surface. When the sheet 12 is made of metal, as is usually the case, an additional disadvantage arises because the corners 16 are insufficiently insulated and may tend to short circuit the silver terminals which are painted around the edge of the enameled base. These difficulties are overcome by rounding the edge of the sheet 12 so as to anticipate the natural tendency of the surface of the enamel to contract. Thus, in Fig. 10, the sheet 12' differs from the sheet 12 in having the rounded edge 18, and in consequence of this the enamel 14' is distributed in a uniform layer entirely around the sheet 12'. This not only effects the desired cure of the difficulties above enumerated, but, we have found, possesses the additional advantage of enhancing the natural covering power of the enamel, so that fewer coats of enamel are necessary, and even one coat may be successfully employed on a plate rounded, as by swaging.

Figure 4:
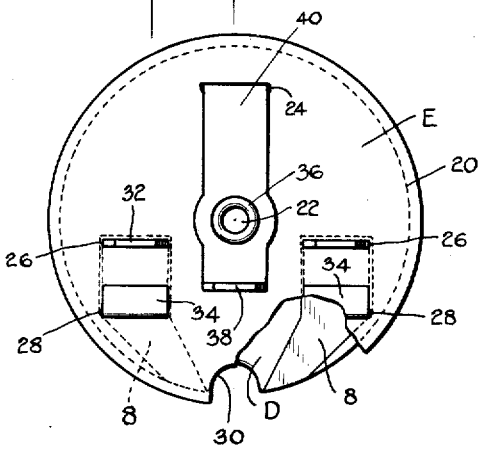
Fig. 4 is a rear elevation of the resistance element assembly.

The connector lug disc E is best shown in Fig. 4. This disc consists simply of a stamping of very thin insulation, such as bakelite. The outer diameter of the disc is made very slightly larger than that of the resistance element D, the periphery of which is indicated by the dotted line 20. The disc, when stamped, is provided with a central aperture 22 and a plurality of slots 24, 26, and 28, as well as a keyway 30. Connector lugs or soldering lugs 32 are attached to the disc E by being threaded through the upper slots 26 and along the face of the disc, and thereafter back through the slots 28, the ends 34 of the lugs being bent upwardly against the disc in order to anchor the lugs securely in place. The extensions of the silver terminals 8 are formed as shown in order to bring the silver into direct contact with the flat portion of the lugs 32 lying between the disc E and the resistance element D. The lugs, as well as the contact arm and other parts subsequently described, are preferably plated with cadmium or tinned so as to prevent poor contact as a result of oxidation or tarnishing.

The connector lug disc E and the resistance element D are preferably preliminarily riveted together to form a sub-assembly. This is most conveniently accomplished by a central rivet 36 which may most economically be made in the form of an eyelet. This same rivet may be used to lock an additional soldering lug 38 in place, and the lug may be prevented from turning about the rivet 36 by means of an extension 40, the end of which is passed through the slot 24 and bent downwardly against the opposite face of the disc E. This incidentally serves to keep the resistance element D and the disc E in parallelism, as is best shown in Fig. 2.

Figure 6:
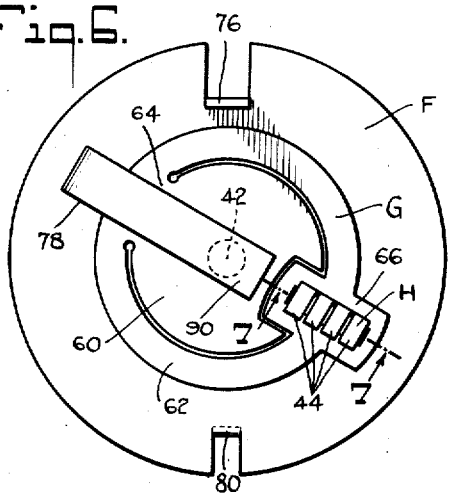
Fig. 6 is an elevation of the bearing plate and contact arm assembly.

The contact arm assembly is best shown in Figs. 2 and 6. It comprises, generally, a bearing plate F which is rigidly attached to a threaded bushing B. This bushing carries a rotatable shaft 42, at one end of which there is flexibly riveted thereto a rotatable contact arm G which in turn carries a sliding brush or contact H.

Figure 7:
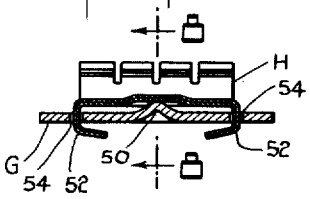
Fig. 7 is an enlarged section taken in the plane of the line 7—7 in Fig. 6.
Figure 8:
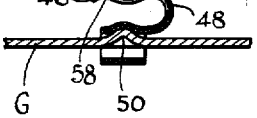
Fig. 8 is a section taken in the plane of the line 8—8 in Fig. 7.

The sliding brush H must be relatively great in width in order to contact with substantially the full surface of the resistance film. To insure good contact at all points along the width of the film, the brush is subdivided to form a plurality of separately movable fingers 44. The construction disclosed in copending application Ser. No. 357,031 previously mentioned, in which leading and trailing fingers are employed, is not suitable in the present resistor, due to the small space available, and particularly the small total length of the resistance film. Accordingly, a single set of contacting fingers is employed, and the configuration of these fingers is best shown in enlarged Figs. 7 and 8 which are sections taken along the lines 7—7 and 8—8 respectively. In Fig. 8 it will be observed that the fingers 44 have an open edge 46 and a closed edge 48. The open edge ordinarily makes better contact with the resistance film than the closed edge 48, and it is therefore preferable that the fingers be so related to the resistance element that the open ends 46 are directed toward the zero resistance terminal of the resistance element. It will also be evident from an inspection of Figs. 7 and 8 that the brush H is pivotally mounted on the contact arm G by reason of a fulcrum or pivot point 50 being formed in the contact arm G, which point bears against the brush H and permits a universal tilting movement of the brush so that it may seat itself as flatly as possible on the resistance film. The ends of the brush are provided with lugs 52 which are freely received in mating slots 54 in the contact arm. This arrangement does not interfere with the desirable free tilting movement of the brush on the contact arm, but at the same time keeps the brush in proper radial alignment so that the fingers are individually pointed in the desired tangential or circumferential direction.

The present brush is novel not only as regards its configuration, but also as regards the material from which it is formed. It has already been explained in the copending applications previously referred to, that the brush is preferably made of a soft metal such as pure silver. This metal seems to have a self-lubricating property when used in cooperation with a resistance film of the type here considered, and in consequence neither the brush nor the film are injuriously abraded even over long periods of wear. At the same time, the desired efficient contact of the brush over the wide resistance film can best be obtained only by the provision of a certain amount of resilience in the contact fingers of the brush. In accordance with the present invention the desirable properties of pure silver for softness, and of phosphor bronze or nickel silver for resilience, are combined without adding to the complexity of the brush and its manufacture. An inspection of Figs. 7 and 8 will show that the brush is made of two laminations of material. The outer lamination 56 is made of pure silver, while the inner lamination 58 is made of resilient material, such as phosphor bronze or nickel silver. In manufacture, these sheets of material may be superimposed and pressed together to form, what is for all practical purposes, only a single sheet of material which may thereafter be fed through the usual dies in order to punch and form the compound sheet of material into the desired brush. In effect, the brush is made of pure silver but is provided with a backing spring of resilient material for urging the silver into contact with the resistance film.

The contact arm G is made of springy material in order to resiliently urge the brush into contact with the resistance film. Ordinarily the desired resilience of the contact arm may be obtained as a result of its having appreciable length between its center of oscillation, or point of attachment of the shaft, and the point of mounting of the brush. In the present case, however, as is obvious by inspection of the drawings, the radius at which the brush is rotated is so small that no appreciable give would be obtainable in the contact arm, if constructed in the conventional manner. We have, accordingly, devised the special contact arm, best shown in Fig. 6, which is characterized by the fact that the central portion 60 thereof is rigidly mounted as by riveting to the shaft 42. An outer portion 62 of the contact arm is fixed to the central portion 60 at one side thereof, as at 64, while the brush H is fixed to the outer portion 62 at the opposite side thereof, as at 66. The contact arm may, of course, be stamped from a single sheet of resilient material, and the outer portion 62 may then be enlarged, as at 66, to accommodate the brush H. It will be evident that in this arrangement the give of the contact arm may take place at the point 66 about the point 64, or, in other words, over a length equal to the diameter rather than the radius of the contact arm. Furthermore, the construction shown is particularly resilient, due to the fact that the central portion 60 is itself somewhat resilient, and due to the fact that the joinder between the central portion 60 and the outer portion 62 is yieldable.

The shaft 42 is permanently but rotatably fastened in the bushing B by reason of the shoulders 70 and 72 formed at the ends thereof, the shoulders 72 receiving the contact arm G. The bushing B is forced or pressed into the bearing plate F and is permanently held thereby. The bearing plate F is circular and has a diameter coinciding with that of the outer edge of the casing A. The bearing plate F is appropriately flanged, as at 74 in order to receive the bushing B. A lug or stop member 76 is struck from the material of the bearing plate F and bent inwardly. This stop member cooperates with a projection 78 at one side of the contact arm G in order to arrest or limit the rotation of the contact arm. Another lug may be struck from the opposite side of the bearing plate and bent outwardly, as at 80, in order to prevent rotation of the entire resistance unit by mating with a recess or aperture 82 in the panel on which the resistor is mounted, this being clearly shown in Fig. 2. It will be understood that when rotation of the resistor need not be so carefully guarded against, the lug 80 and aperture 82 may be omitted.

It has already been pointed out that a connector lug 38 is provided on the resistance element assembly, and that this lug is not connected electrically with the resistance film, but is connected both mechanically and electrically with the central rivet or eyelet 36. The lug 38 is intended to be brought into electrical contact with the rotatable arm G, and this contact is most simply and satisfactorily obtained by forming the contact arm G with a relatively long extension 78, and bending the major portion of the extension over toward the center of the contact arm so as to form a resilient contact 90 which bears against the rivet or eyelet 36. This resilient engagement incidentally serves to hold the resistance element against the bottom of the casing A.

The casing A is preferably molded out of bakelite or similar insulation. The bottom is provided with slots 92 for permitting the lugs 32 and 38 to pass therethrough. The bottom periphery may also be provided with a shoulder 94 for receiving and supporting the lug holding disc E. A key 96 is provided in order to prevent rotation of the resistance element assembly within the casing. Projections 98 and 100 may be formed at the open periphery of the casing in order to fill in the openings left in the bearing plate F when the stop lug 76 and the anchoring lug 80 are struck therefrom. This mating engagement incidentally causes proper alignment of the bearing plate with respect to the casing, and prevents rotation of the bearing plate relative to the casing.

An inspection of Fig. 3 shows that the resistance element assembly D, E may simply be dropped into the casing A, the lugs 32 and 38 passing readily through the slots 92. The resistance element must be properly aligned, and is held so by reason of the keyway 96. The contact arm assembly F, G, H is next applied to the casing and can be received only in proper alignment by reason of the projections 98 and 100. These, it may incidentally be mentioned, are preferably made different in size so as to prevent the bearing plate F from being mounted 180 degrees out of proper alignment. The bearing plate is next locked to the casing A by means of the sealing ring J. This ring is preferably made of a very thin brass so that it may readily be rolled downwardly to form the closing flange 102 without appreciably increasing the dimensions of the resistor. The material of the ring is preferably made quite thin for the additional reason that otherwise, when the nut 104 is tightened on the threaded bushing B in order to lock the resistor against the panel, there will be a tendency to draw the bearing plate F outwardly and to appreciably distort the same. Of course a shoulder may be formed in the bearing plate to prevent this distortion, but the present construction is far simpler and cheaper to manufacture, and no noticeable difficulty results because of the thinness of the flange 102 of the sealing ring J.

The lugs 32 and 38 may be shaped as desired, according to the type of conductor to be soldered or otherwise attached thereto, and the lugs may be left projecting directly outwardly from the resistor, or they may be bent downwardly in the manner shown in Fig. 1, depending upon the use to which the resistor is to be put. It will also be understood that the threaded bushing B may be altered in length to fit the requirements of any particular installation, and that any appropriate type of knob C may be affixed to the end of the shaft 42, as by the use of a set screw, or the like.

The mode of constructing and assembling the variable resistor of our invention, and the many advantages thereof, will, it is thought, be apparent from the foregoing detailed description thereof. The resistor is of the advantageous type employing a resistance film on an insulation base, which provides an exceedingly smooth and non-microphonic resistance variation the amount of which may be made linear or tapered, as desired. Although the resistor is of the film type, it is nevertheless made so compact in construction that the dimension thereof is considerably smaller than other variable types of resistor not possessing the advantages of the continuous film resistor. The insulation base may be made of enameled sheet metal with no difficulty in enameling the same, although a perfectly plane surface and insulated edge is desired. The sliding brush contact possesses the advantages of pure silver and the resilience of springy metal such as phosphor bronze. The contact arm is made exceedingly small, and yet has a resilience equivalent to that of a relatively long arm. A single stamping for the arm incidentally includes a stop member to limit the rotation thereof, and a resilient contact for making electrical circuit therewith and for holding the resistance element in place. The assembly of the unit is simplified by providing sub-assemblies which may be put together with but little trouble and without the possibility of mistakes or erroneous alignment in the assembly.

It will be apparent that while we have shown and described our invention in the preferred form, many changes and modifications may be made in the structure disclosed without departing from the spirit of the invention, defined in the following claims.

We claim:

1. In the manufacture of resistance units comprising an enameled base painted with a film of resistance material, the method of preventing the formation of a ridge of enamel near the edge of the base which includes rounding the edge of the base before coating the same with enamel.

2. In the manufacture of variable resistance units comprising an enameled metallic disc painted with an annular film of resistance material, the method of preventing the formation of a ridge of enamel near the periphery of the disc which includes rounding the edge of the disc before coating the same with enamel.

3. A variable resistor comprising an insulation base, a resistance film coated on said base near the edge thereof, and a movable contact arranged for movement over said resistance film, said base comprising sheet material coated with enamel, the outer edge of said sheet material being rounded prior to the application of enamel thereto.

4. A variable resistor comprising an enameled base, an annular resistance film coated on one face of said base near the periphery thereof, and a movable contact arranged for movement over said resistance film, said base comprising a metallic disc coated with enamel, the outer edge of said disc being rounded prior to the application of enamel thereto.

5. A variable resistor including an insulation base comprising a metallic blank the peripheral edge of which is rounded, and the entire surface of which is coated with enamel, a film of resistance material painted on one face of said base near the periphery thereof, silver terminals painted over the resistance material at the ends of the resistance film, said terminals extending around the edge of the base and onto the back thereof.

6. A variable resistor comprising a metallic disc the peripheral edge of which is rounded, and the entire surface of which is coated with enamel, an annular film of resistance material painted on one face of said disc near the periphery thereof, silver terminals painted over the resistance material at the ends of the resistance film, said terminals extending around the edge of the disc and onto the back thereof in order to make contact with connector lugs.

7. A variable resistor comprising an insulation base, a resistance film coated thereon, and a movable brush for making sliding contact with said resistance film, said brush being formed of a laminated piece of material comprising an outer lamination of pure silver and an inner lamination of relatively resilient material such as phosphor bronze, both of said sheets being similarly shaped and bent into suitable configuration to form the desired brush, said configuration including bent holding lugs, whereby no fastening means are needed for securing the laminations together.

8. A compact variable resistance of small diameter including a cup-shaped housing provided with apertures in the bottom thereof for receiving connector lugs, a resistance element comprising an insulation disc, an annular film of resistance material painted around one face of the disc near the periphery thereof, and a terminal extending to the opposite face thereof, a connector lug riveted to the center of the disc, a connector lug in appropriate position for bearing against the terminal, said resistance element being received in said housing, a bearing plate arranged to fit on the top of the housing, a rotatable shaft supported therein, a contact arm fixed to said rotatable shaft, said contact arm including a resilient portion for engaging the resistance film and an additional portion bearing against the aforesaid center rivet of the resistance element.

9. A compact variable resistance of small diameter including a cup-shaped insulation housing provided with apertures in the bottom thereof for receiving connector lugs, a resistance element comprising a disc coated with enamel, an annular film of resistance material painted around one face of the disc near the periphery thereof, and a silver terminal painted over the resistance film at the end thereof and around the edge of the disc and onto the opposite face thereof, a disc of insulation riveted centrally to the aforesaid resistance element and to a connector lug, an additional connector lug attached to the disc in appropriate position for bearing against the aforementioned extension of the silver terminal, said resistance element and connector lug disc being received as a unit in the bottom of the housing, a bearing plate arranged to fit on the top of the housing, a rotatable shaft supported therein, and a rotatable contact arm fixed to said rotatable shaft, said contact arm including a resilient portion carrying a brush for engaging the resistance film and an additional portion bent over to a point opposite the end of the shaft in order to bear against the aforesaid rivet at the center of the resistance element.

10. A compact variable resistance of small diameter including a cup-shaped insulation housing provided with apertures in the bottom thereof for receiving connector lugs, a resistance element comprising a metallic disc having a rounded edge and coated with enamel, an annular film of resistance material painted around one face of the disc near the periphery thereof, and silver terminals painted over the resistance film at the ends thereof and around the edge of the disc and onto the opposite face thereof, a thin disc of insulation riveted concentrically to the aforesaid resistance element and to a connector lug by means of a central eyelet, additional connector lugs attached to the insulation disc through slots therein in appropriate position for bearing against the aforementioned extensions of the silver terminals, said resistance element and connector lug disc being received as a unit in the bottom of the housing, a bearing plate arranged to fit on the top of the housing, a rotatable shaft supported therein, a rotatable contact arm fixed to said rotatable shaft, said contact arm including a resilient portion carrying a brush for engaging the resistance film and an additional portion bent over to a point opposite the end of the shaft in order to bear against the aforesaid eyelet at the center of the resistance element so as to make contact with the said eyelet and in order to hold the resistance element at the bottom of the housing, and a thin metallic sealing ring holding the bearing plate and housing together.

11. A variable resistor including a housing provided with apertures for receiving connector lugs, a resistance element comprising a metallic disc having a rounded edge and coated with enamel, an annular film of resistance material painted around one face of the disc near the periphery thereof, and silver terminals painted over the resistance film at the ends thereof and around the edges of the disc and onto the opposite face thereof, a disc of insulation riveted to the aforesaid resistance element and to a connector lug by means of a central rivet, additional connector lugs attached to the insulation disc through slots therein in appropriate position for bearing against the aforementioned extensions of the silver terminals, said resistance element and connector lug disc being received as a unit in the bottom of the housing, and a rotatable contact arm mounted on said housing, said contact arm including means contacting with the aforesaid rivet.

12. A variable resistor comprising an insulation base, a resistance film coated thereon, and a movable brush for making sliding contact with said resistance film, said brush being formed of a laminated piece of material comprising an outer lamination of a soft highly conductive contact metal and an inner lamination of relatively harder and more resilient material, both of said sheets being similarly shaped and bent into suitable configuration to form the desired brush, said configuration including bent holding lugs, whereby no fastening means are needed for securing the laminations together.

13. A variable resistor structure comprising a generally circular resistance element, a rotatable shaft terminating with an end at one side of the resistance element, a rotatable contact arm fixed on the end of the shaft adjacent the resistance element, a fixed stop lug forming a part of said resistor structure, and a central contact for electrical connection to said arm, said contact arm being stamped out of a single piece of resilient sheet metal and comprising a central portion fixed to said shaft, an annular outer portion joined to said central portion at one side thereof, a slidable brush mounted on the annular outer portion of the contact arm at the opposite side thereof, said contact arm further including an extension from the first side thereof projecting outwardly and then reversely bent upon itself to a point in axial alignment with the shaft for cooperation with the aforesaid central contact during rotation of the arm, the outward projection cooperating with the aforesaid stop means of the resistor in order to limit the movement of the slidable brush at the opposite side of the arm.

14. A compact variable resistor comprising a generally circular insulation base, an annular resistance film coated thereon near the periphery thereof, a fixed metallic contact element at the center thereof, a rotatable shaft terminating at one side of said base, and a rotatable contact arm mounted on the end of the shaft adjacent the base, said contact arm being stamped out of a single piece of resilient sheet metal and comprising a generally circular central portion fixed to said shaft, an annular outer portion the diameter of which is approximately equal to that of the base fixed to said central portion at one side thereof, and a brush slidable on the resistance film of the base and pivotally fixed to the annular outer portion of the contact arm at the opposite side thereof, said contact arm further including an extension from the first side thereof bent over from the periphery of the annular member to a point in axial alignment with the shaft in order to form a relatively long resilient circuit-making contact spring for continuous contact with the aforesaid fixed metallic contact element during the rotation of the contact arm.

15. A resistance element for a variable resistance unit, said resistance element comprising an insulation base, resistance material on one surface of said base, and conductive terminals painted on said element and extending from the resistance material around an edge of the base to a different surface thereof, said edge being rounded before having the conductive terminals painted thereover in order to avoid carrying the terminals around a sharp edge.

16. A resistance element for a variable resistance unit, said resistance element comprising an annular insulation base, an arcuate resistance film painted on one surface of said base at the periphery thereof, and conductive terminals painted on said element and extending from the resistance film around an edge of the base to a different surface thereof, whereby contact with said terminals may be made within the periphery of the annular element without increasing the diameter of said element.

17. A variable resistor comprising an insulation base, resistance material on one surface of said base, a movable contact arranged for movement over said resistance material, painted conductive terminals extending from the resistance material around an edge of the base to a surface different from the surfaces receiving the resistance material, and soldering lugs bearing against said terminals.

18. A variable resistor comprising a circular insulation base, an arcuate resistance film coated on one surface of said base, a movable contact arranged for movement over said resistance film, conductive terminals painted on said insulation base and extending from the resistance film around an edge of the base to a surface different from the surface receiving the resistance film, and soldering lugs bearing against said second surface and contacting said terminals, the points of contact with said soldering lugs being located within the outer periphery of the arcuate resistance film.

19. A variable resistor comprising a casing, a resistance element received therein and comprising an insulation base carrying an arcuate strip of resistance material, a rotatable shaft carrying a contact arm for slidably engaging said resistance material, a soldering lug extending into the casing near one end thereof, and means providing conductive engagement between the resistance element and the soldering lug, said means including conductive paint extending from the resistance material around an edge of the element to a point on the side of the element facing the inner end of the soldering lug.

20. A variable resistor comprising a relatively shallow cylindrical casing, a resistance element received within said casing and comprising a circular insulation base coated with an arcuate film of resistance material, a rotatable shaft carrying a contact arm for slidably engaging said resistance film, soldering lugs extending into the casing near one end thereof, means providing conductive contact engagement between the resistance element and the soldering lugs, said means including conductive paint extending from the resistance film around an edge of the element to points on the side of the element facing the inner ends of the soldering lugs, and means holding the element against the soldering lugs for contact therewith.

JOSEPH A. FLANZER.
LESTER L. JONES.
EMIL REISMAN.